(12) United States Patent
Park et al.

(10) Patent No.: US 10,374,532 B2
(45) Date of Patent: Aug. 6, 2019

(54) APPARATUS, SYSTEM AND METHOD OF FAULT DIAGNOSIS FOR PERMANENT MAGNET MOTOR

(71) Applicant: KOREA ELECTRONICS TECHNOLOGY INSTITUTE, Seongnam-si, Gyeonggi-do (KR)

(72) Inventors: Joonsung Park, Seoul (KR); Jinhong Kim, Suwon-si (KR); Byongjo Hyon, Gunpo-si (KR); Junhyuk Choi, Bucheon-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 64 days.

(21) Appl. No.: 15/660,140

(22) Filed: Jul. 26, 2017

(65) Prior Publication Data

US 2018/0294751 A1    Oct. 11, 2018

(30) Foreign Application Priority Data

Apr. 6, 2017 (KR) .................. 10-2017-0044620

(51) Int. Cl.
  *H02P 6/12*  (2006.01)
  *H02P 6/08*  (2016.01)
  *H02P 29/024*  (2016.01)
  *H02P 6/24*  (2006.01)
  *H02P 6/18*  (2016.01)

(52) U.S. Cl.
  CPC .............. *H02P 6/12* (2013.01); *H02P 6/085* (2013.01); *H02P 29/0241* (2016.02); *H02P 6/18* (2013.01)

(58) Field of Classification Search
  CPC ........ H02P 6/18; H02P 29/0241; H02P 6/085; H02P 6/12
  USPC .......................................... 318/400.21, 400.3
  See application file for complete search history.

(56) References Cited

U.S. PATENT DOCUMENTS

| 2014/0159621 A1* | 6/2014 | Gu | ................. H02P 29/0243 318/400.02 |
| 2014/0160602 A1* | 6/2014 | Gu | ....................... G01R 31/34 361/31 |
| 2015/0249411 A1* | 9/2015 | Nakamura | ................ H02P 6/18 318/400.3 |

(Continued)

FOREIGN PATENT DOCUMENTS

| EP | 2808999 A1 | 12/2014 |
| JP | 2012-215514 A | 11/2012 |

(Continued)

OTHER PUBLICATIONS

Korean Notice of Allowance/Decision to Grant Patent with English Translation, Application No. 10-2017-0044620, dated Dec. 26, 2017 in 3 pages.

*Primary Examiner* — Kawing Chan
*Assistant Examiner* — Zemenay T Truneh
(74) *Attorney, Agent, or Firm* — Knobbe Martens Olson & Bear (57) ABSTRACT

Disclosed are an apparatus, system and method for detecting, based on a mathematical model, a fault of a permanent magnet motor driven by a square wave. A fault diagnosis apparatus for the permanent magnet motor includes a current voltage measurement unit, a phase shift time calculation unit, and a control unit.

9 Claims, 6 Drawing Sheets

(56) References Cited

U.S. PATENT DOCUMENTS

2015/0270747 A1* 9/2015 Toliyat .................. H02K 5/132
310/68 R

FOREIGN PATENT DOCUMENTS

KR 10-0925148 B1 11/2009
KR 10-1357828 B1 2/2014

* cited by examiner

APPARATUS, SYSTEM AND METHOD OF FAULT DIAGNOSIS FOR PERMANENT MAGNET MOTOR

TECHNICAL FIELD

The described technology relates to a fault diagnosis technique for a permanent magnet motor, and more particularly, to an apparatus, system and method for detecting, based on a mathematical model, a fault of a permanent magnet motor driven by a square wave.

BACKGROUND

Normally, a permanent magnet motor refers to a motor that uses a permanent magnet as a field magnet. In the permanent magnet motor, a stator is composed of a core and a coil, and the coil is wound around a slot of the core. An insulator surrounds the outer surface of the coil so as to prevent a short circuit between adjacent coils.

However, as time progresses, the insulator may deteriorate because of a high voltage and heat. Unfortunately, this causes a short circuit (also referred to as a turn short) between adjacent coils. If such a short circuit occurs, the performance of the permanent magnet motor is degraded. Namely, the short-circuited coils are formed into a single circuit, and a high current is generated due to the magnetic flux of the stator. The high current causes copper loss, which leads to an increase in heat generation, which accelerates the breakdown of the insulator. Eventually, the permanent magnet motor may be destroyed so as not to operate, and sometimes a fire may occur. Therefore, it is necessary to detect and cope with the occurrence of a short circuit in the permanent magnet motor at an early stage.

Meanwhile, typically, a lot of time is consumed depending on a lot of tests in determining the criterion for detecting whether the permanent magnet motor is short-circuited. Also, it is difficult to detect a fault of the permanent magnet motor while the permanent magnet motor is running.

SUMMARY

Accordingly, the described technology is to provide an apparatus, system and method for detecting in real time a fault of a permanent magnet motor driven by a square wave while the permanent magnet motor is in operation.

In addition, the described technology is to provide an apparatus, system and method for detecting a phase and degree of a fault of a permanent magnet motor as well as the occurrence of the fault.

According to various embodiments of the present invention, a fault diagnosis apparatus for a permanent magnet motor includes a current voltage measurement unit, a phase shift time calculation unit, and a control unit. The current voltage measurement unit is configured to measure an input current and an input voltage of an inverter connected to the permanent magnet motor driven by a square wave. The phase shift time calculation unit is configured to calculate a phase shift time between start and end of a phase shift in the permanent magnet motor. The control unit is configured to calculate an inductance of each phase with respect to a stator of the permanent magnet motor by using the input current and the input voltage measured by the current voltage measurement unit and the phase shift time calculated by the phase shift time calculation unit, to compare the calculated inductance of each phase with a reference inductance of each phase, and to determine whether a fault occurs in the permanent magnet motor.

In the apparatus, the control unit may include an inductance calculation unit and a fault diagnosis unit. The inductance calculation unit may be configured to calculate the inductance of each phase with respect to the stator by using a voltage equation of the permanent magnet motor, based on the input current, the input voltage and the phase shift time. The fault diagnosis unit may be configured to calculate an error value by comparing the inductance of each phase calculated by the inductance calculation unit with the reference inductance, and if the calculated error value is not included in a normal range, to determine that a coil wound in the corresponding phase is short-circuited.

In the apparatus, the voltage equation used by the inductance calculation unit may be obtained as Equation 1:

$$\begin{cases} v_{us} = Ri_u + L_1 \dfrac{di_u}{dt} + e_u \\ v_{vs} = Ri_v + L_2 \dfrac{di_v}{dt} + e_v \\ v_{ws} = Ri_w + L_3 \dfrac{di_w}{dt} + e_w \end{cases} \quad \text{[Equation 1]}$$

where $v_{us}$, $v_{vs}$, and $v_{ws}$ denote a u-phase voltage, a v-phase voltage, and a w-phase voltage of the permanent magnet motor, respectively, where $i_u$, $i_v$, and $i_w$ denote a u-phase current, a v-phase current, and a w-phase current of the permanent magnet motor, respectively, where $L_1$, $L_2$, and $L_3$ denote a u-phase inductance, a v-phase inductance, and a w-phase inductance of the permanent magnet motor, respectively, where $e_u$, $e_v$, and $e_w$ denote a u-phase back electromotive force, a v-phase back electromotive force, and a w-phase back electromotive force of the permanent magnet motor, respectively, and where R denotes a resistance of the permanent magnet motor.

In the apparatus, the inductance calculation unit may be further configured to calculate the inductance of each phase by using Equation 2 derived from Equation 1:

$$L_1 = \dfrac{(t_2 - t_1)\left(\dfrac{DV_{dc}}{3} - \sqrt{2}\,E\right)}{(I_{dc\_e} - I_{dc\_s})} \quad \text{[Equation 2]}$$

where $L_n$ denotes the inductance of each phase, where n is from 1 to 3, where $t_2-t_1$ denotes the phase shift time, where $t_1$ denotes a start time of the phase shift and $t_2$ denotes an end time of the phase shift, where D denotes a PWM duty ratio, where $V_{dc}$ denotes the input voltage, where E denotes an effective value of the back electromotive force, where $I_{dc\_s}$ denotes an input current at the phase shift start, and where $I_{dc\_e}$ denotes an input current at the phase shift end.

In the apparatus, the fault diagnosis unit may be further configured to determine that a degree of the short circuit is greater as the error value is larger.

In the apparatus, the fault diagnosis unit may be further configured to classify degrees of the short circuit into ratings and to generate an alert signal corresponding to each rating.

In the apparatus, the fault diagnosis unit may be further configured to detect in real time the short circuit of the wound coil while the permanent magnet motor is in operation.

In the apparatus, the permanent magnet motor may have the coil wound on the stator in wye configuration or delta configuration.

According to various embodiments of the present invention, a fault diagnosis system includes a permanent magnet motor, an inverter, and a fault diagnosis apparatus. The permanent magnet motor is driven by a square wave. The inverter includes a plurality of switching devices connected to each other through a three-phase bridge, and configured to output an output current and an output voltage to the permanent magnet motor according to on/off states of the plurality of switching devices. The fault diagnosis apparatus includes a current voltage measurement unit, a phase shift time calculation unit, and a control unit. The current voltage measurement unit is configured to measure an input current and an input voltage of the inverter. The phase shift time calculation unit is configured to calculate a phase shift time between start and end of a phase shift in the permanent magnet motor. The control unit is configured to calculate an inductance of each phase with respect to a stator of the permanent magnet motor by using the input current and the input voltage measured by the current voltage measurement unit and the phase shift time calculated by the phase shift time calculation unit, to compare the calculated inductance of each phase with a reference inductance of each phase, and to determine whether a fault occurs in the permanent magnet motor.

According to various embodiments of the present invention, a fault diagnosis method for a permanent magnet motor includes, at a fault diagnosis apparatus, measuring an input current and an input voltage of an inverter connected to the permanent magnet motor driven by a square wave; at the fault diagnosis apparatus, calculating a phase shift time between start and end of a phase shift in the permanent magnet motor; at the fault diagnosis apparatus, calculating an inductance of each phase with respect to a stator of the permanent magnet motor by using the input current and the input voltage measured by the current voltage measurement unit and the phase shift time calculated by the phase shift time calculation unit; and at the fault diagnosis apparatus, determining whether a fault occurs in the permanent magnet motor, by comparing the calculated inductance of each phase with a reference inductance of each phase.

According to the fault diagnosis apparatus, system and method of the present invention, it is possible to detect in real time a fault of the permanent magnet motor, even while the permanent magnet motor is running, by calculating the inductance of each phase of the permanent magnet motor and comparing the calculated inductance with a reference inductance of each phase.

Additionally, if any error value between the calculated inductance and the reference inductance of each phase is not included in a normal range, it may be determined that a coil wound in the corresponding phase is short-circuited.

Also, as the error value is larger, the degree of the short circuit may be determined to be greater.

DETAILED DESCRIPTION

Now, exemplary embodiments of the present invention will be described in detail with reference to the accompanying drawings. In the drawings, the same reference numerals are used to designate the same or similar elements. In the following description of embodiments, well known functions and elements may not be described in detail to avoid obscuring the subject matter of the present invention.

Figure 1:
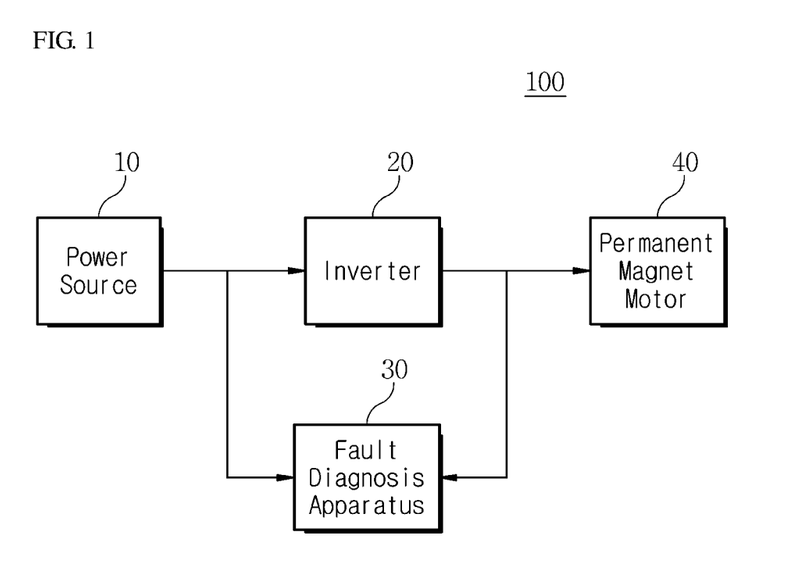
FIG. 1 is a block diagram illustrating a fault diagnosis system for a permanent magnet motor according to an embodiment of the present invention.
Figure 2:
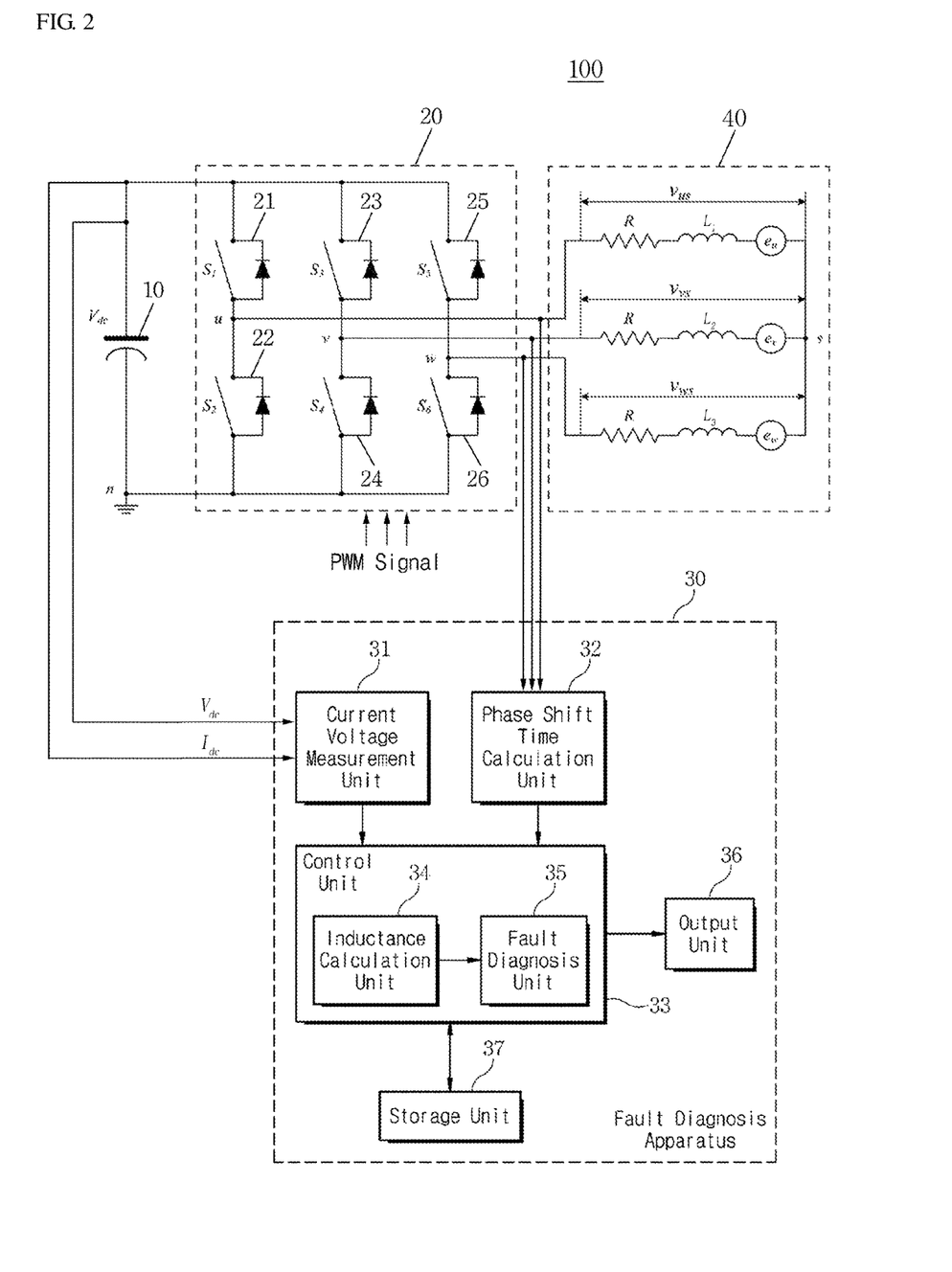
FIG. 2 is a schematic diagram illustrating a fault diagnosis system for a permanent magnet motor according to an embodiment of the present invention.

FIG. 1 is a block diagram illustrating a fault diagnosis system for a permanent magnet motor according to an embodiment of the present invention. FIG. 2 is a schematic diagram illustrating a fault diagnosis system for a permanent magnet motor according to an embodiment of the present invention.

As shown in FIGS. 1 and 2, a fault diagnosis system 100 detects, in real time, a fault of a permanent magnet motor 40 driven by a square wave. Specifically, the fault diagnosis system 100 for the permanent magnet motor 40 detects not only the occurrence of a fault in the permanent magnet motor 40 but also the degree of the fault and a phase in which the fault occurs. The fault diagnosis system 100 includes an inverter 20, a fault diagnosis apparatus 30, and the permanent magnet motor 40, and may further include a power source 10.

The power source 10 is connected at one end thereof to the inverter 20 to supply a voltage and a current to the inverter 20 and connected at the other end to the ground (GND). The power source 10 may supply DC power or supply AC power. If the power source 10 supplies the AC power to the inverter 20, a rectifying circuit (not shown) may be further provided to an input terminal of the inverter 20 to convert the AC power into the DC power.

The inverter 20 is connected at one end thereof to the power source 10 and connected at the other end to the permanent magnet motor 40 and includes a plurality of switching devices 21, 22, 23, 24, 25 and 26. Specifically, the inverter 20 includes a first switching device 21, a second switching device 22, a third switching device 23, a fourth switching device 24, a fifth switching device 25, and a sixth switching device 26. In this case, the inverter 20 has a three-phase bridge. Namely, in the inverter 20, the first and second switching devices 21 and 22 are connected to each other by a bridge to form a u-phase, the third and fourth switching devices 23 and 24 are connected to each other by a bridge to form a v-phase, and the fifth and sixth switching devices 25 and 26 are connected to each other by a bridge to form a w-phase. Here, each switching device includes a switch and a freewheeling diode. The inverter 20 may adjust an output current and an output voltage according to the on/off states of the first to sixth switching devices 21 to 26, and outputs the adjusted output current and output voltage to the permanent magnet motor 40.

The fault diagnosis apparatus 30 calculates an inductance of each phase with respect to the stator of the permanent magnet motor 40 by using an input current and an input voltage of the inverter 20 and a phase shift time of the permanent magnet motor 40. In addition, by comparing the calculated inductance of each phase with a reference inductance of each phase, the fault diagnosis apparatus 30 detects whether any fault occurs in the permanent magnet motor 40. Here, the reference inductance refers to an inductance of the permanent magnet motor 40 in a normal state.

Specifically, the fault diagnosis apparatus 30 includes a current voltage measurement unit 31, a phase shift time calculation unit 32, and a control unit 33. The fault diagnosis apparatus 30 may further include an output unit 36 and a storage unit 37.

The current voltage measurement unit 31 measures an input current and an input voltage of the inverter 20. Namely, the current voltage measurement unit 31 is connected to an input terminal of the inverter 20 and measures a current and a voltage inputted from the power source 10 to the inverter 20. At this time, the measured input current and input voltage may be DC.

The phase shift time calculation unit 32 calculates a phase shift time between the start and end of a phase shift in the permanent magnet motor 40. Namely, the phase shift time calculation unit 32 measures a phase shift start time and a phase shift end time in the permanent magnet motor 40 and then calculates the phase shift time by subtracting the phase shift start time from the phase shift end time.

The control unit 33 calculates an inductance of each phase with respect to the stator of the permanent magnet motor 40 by using the input current and the input voltage, measured by the current voltage measurement unit 31, and the phase shift time calculated by the phase shift time calculation unit 32. Also, the control unit 33 compares the calculated inductance of each phase with the reference inductance of the permanent magnet motor 40 and then determines whether a fault occurs in the permanent magnet motor 40. Specifically, the control unit 33 includes an inductance calculation unit 34 and a fault diagnosis unit 35.

The inductance calculation unit 34 receives the input current and the input voltage of the inverter 20 from the current voltage measurement unit 31 and also receives the phase shift time of the permanent magnet motor 40 from the phase shift time calculation unit 32. Then, based on the received input current, input voltage and phase shift time, the inductance calculation unit 34 calculates the inductance of each phase with respect to the stator by using a voltage equation of the permanent magnet motor 40. Namely, the inductance calculation unit 34 calculates the inductances of the u-phase, v-phase and w-phase of the permanent magnet motor 40, respectively.

The fault diagnosis unit 35 compares the inductance of each phase, calculated by the inductance calculation unit 34, with the reference inductance to calculate an error value. As mentioned above, the reference inductance is the inductance of the permanent magnet motor 40 in a normal state. If the calculated error value is not included in a normal range, the fault diagnosis unit 35 determines in real time that a coil wound in the corresponding phase is short-circuited. Namely, it is possible to detect in real time a short circuit of the coil wound around the stator while the permanent magnet motor 40 is in operation.

Specifically, the fault diagnosis unit 35 may detect a short circuit of the permanent magnet motor 40 only by the value of the inductance without actually checking a short-circuit state of the permanent magnet motor 40. The fault diagnosis unit 35 may not only determine a specific phase where the short circuit occurs, but also determine the degree of the short circuit from the error value. At this time, the fault diagnosis unit 35 may determine that the degree of the short circuit is greater as the error value is larger.

The output unit 36 outputs the inductance of each phase calculated by the inductance calculation unit 34. Also, the output unit 36 outputs a detection result of the fault diagnosis unit 35. The output unit 36 may be a display, a monitor, a printer, a projector, a speaker, an alarm, or any other equivalent.

The storage unit 37 stores the input current and input voltage measured by the current voltage measurement unit 31. Also, the storage unit 37 stores the phase shift time calculated by the phase shift time calculation unit 32. Also, the storage unit 37 stores the inductance of each phase calculated by the inductance calculation unit 34. Also, the storage unit 37 stores the detection result of the fault diagnosis unit 35. The storage unit 37 may include at least one of a flash memory, a hard disk, a multimedia card micro type memory, a card type memory (e.g., SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

Although the fault diagnosis apparatus 30 is shown and described as an independent structure being separate from the permanent magnet motor 40 in FIGS. 1 and 2, this is exemplary only and not to be construed as a limitation of this invention. Alternatively, the fault diagnosis apparatus 30 may be equipped in a controller within the permanent magnet motor 40.

The permanent magnet motor 40 is a motor driven by a square wave and is connected to a load (not shown). Preferably, the permanent magnet motor 40 may be a brushless DC (BLDC) motor. The permanent magnet motor 40 includes a stator (not shown) and a rotor (not shown). The stator has three phases (i.e., u, v, and w) of a wound field magnet. Three phase stators are disposed at intervals of 120 degrees and act as magnetic poles (i.e., N pole or S pole) depending on the direction of the current flowing in each stator. Meanwhile, in the permanent magnet motor 40, the coil may be wound on the stators in the wye (Y) configuration or the delta ($\Delta$) configuration.

The permanent magnet motor 40 may rotate the rotor by means of a two-phase excitation scheme in which only two phase stators are excited and the other phase stator is not excited. In this case, with respect to each phase, the permanent magnet motor 40 includes a resistor (R), an inductor (L), and a back electromotive force.

Figure 3:
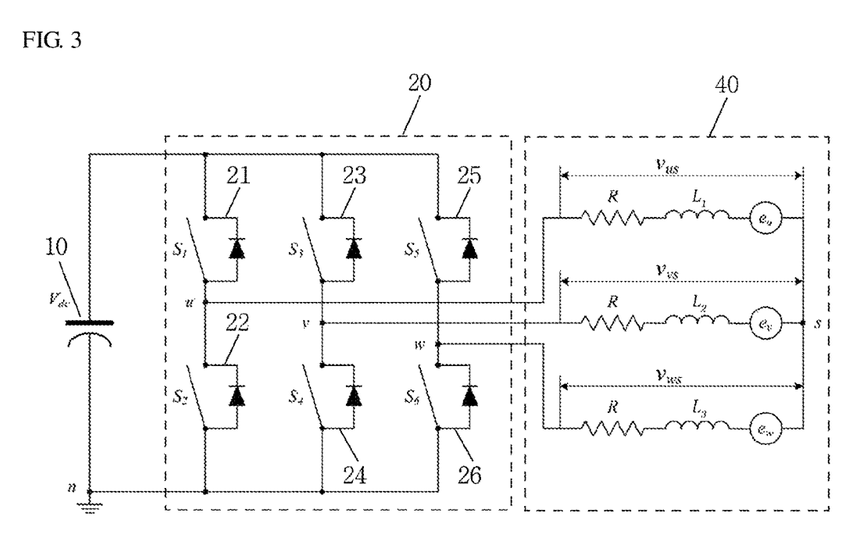
FIG. 3 is a circuit diagram illustrating an equivalent circuit of a permanent magnet motor and an inverter according to an embodiment of the present invention.
Figure 4:
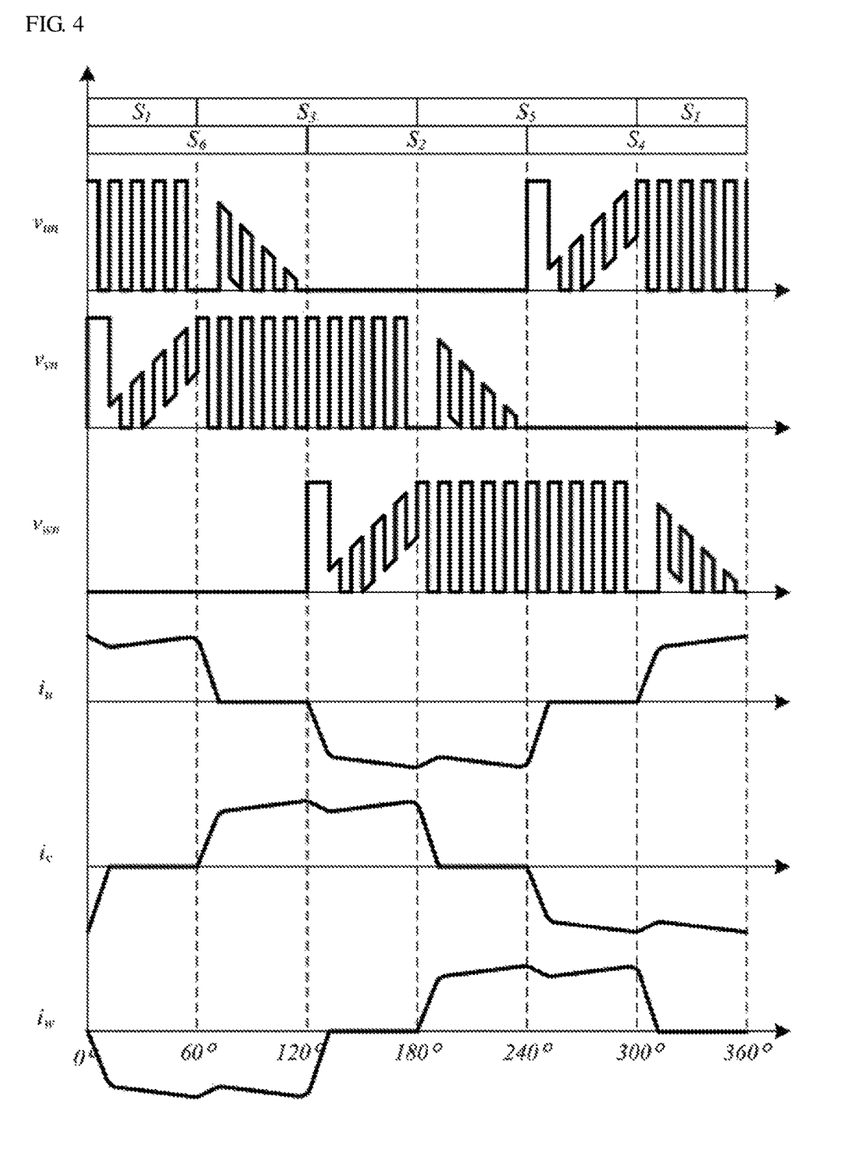
FIG. 4 is a graph illustrating a phase voltage waveform and a phase current waveform in the equivalent circuit of FIG. 3.
Figure 5:
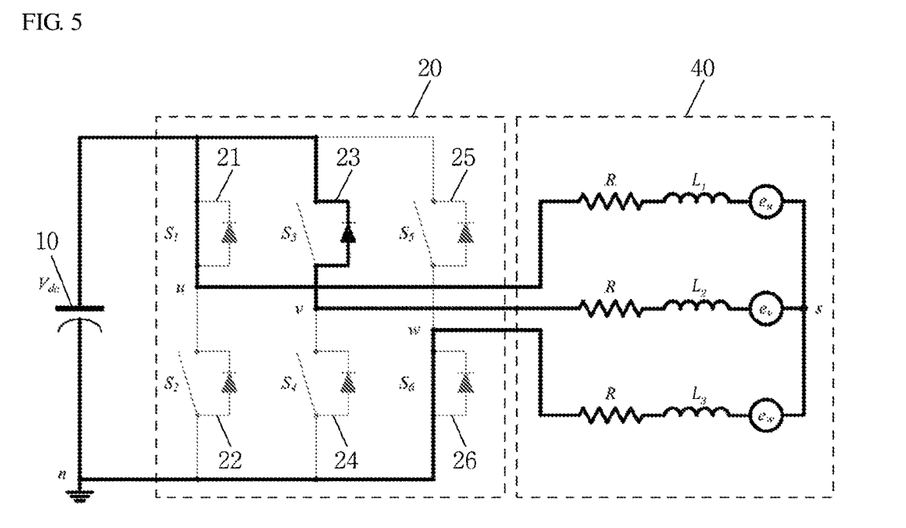
FIG. 5 is a circuit diagram illustrating a transition state with respect to a v-phase current in the equivalent circuit of FIG. 3.
Figure 6:
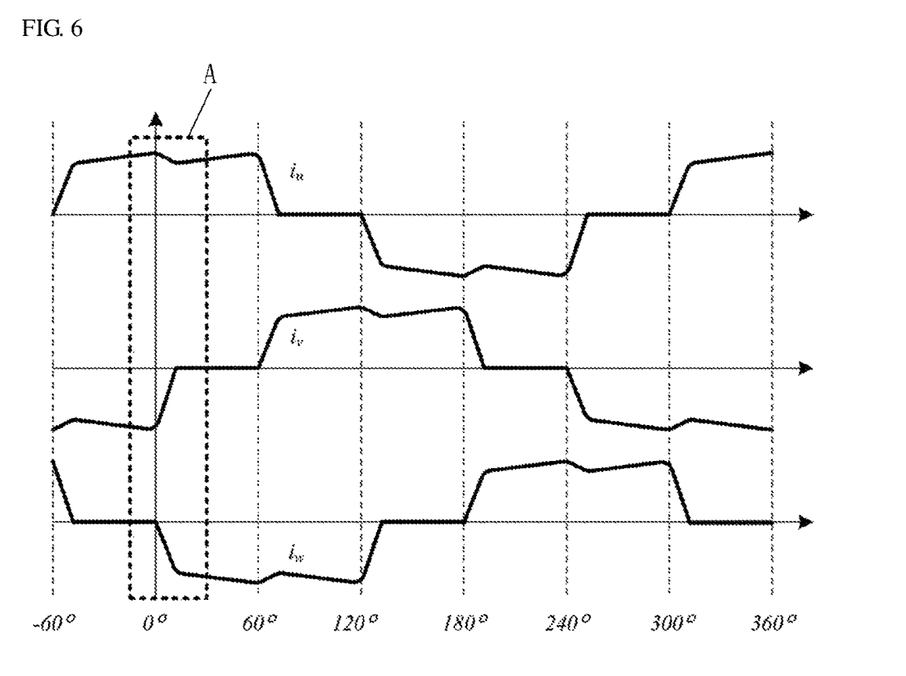
FIG. 6 is a graph illustrating a phase current waveform with respect to a phase change in the equivalent circuit of FIG. 5.

FIG. 3 is a circuit diagram illustrating an equivalent circuit of a permanent magnet motor and an inverter according to an embodiment of the present invention. FIG. 4 is a graph illustrating a phase voltage waveform and a phase current waveform in the equivalent circuit of FIG. 3. FIG. 5 is a circuit diagram illustrating a transition state with respect to a v-phase current in the equivalent circuit of FIG. 3. FIG. 6 is a graph illustrating a phase current waveform with respect to a phase change in the equivalent circuit of FIG. 5.

Figure 7:
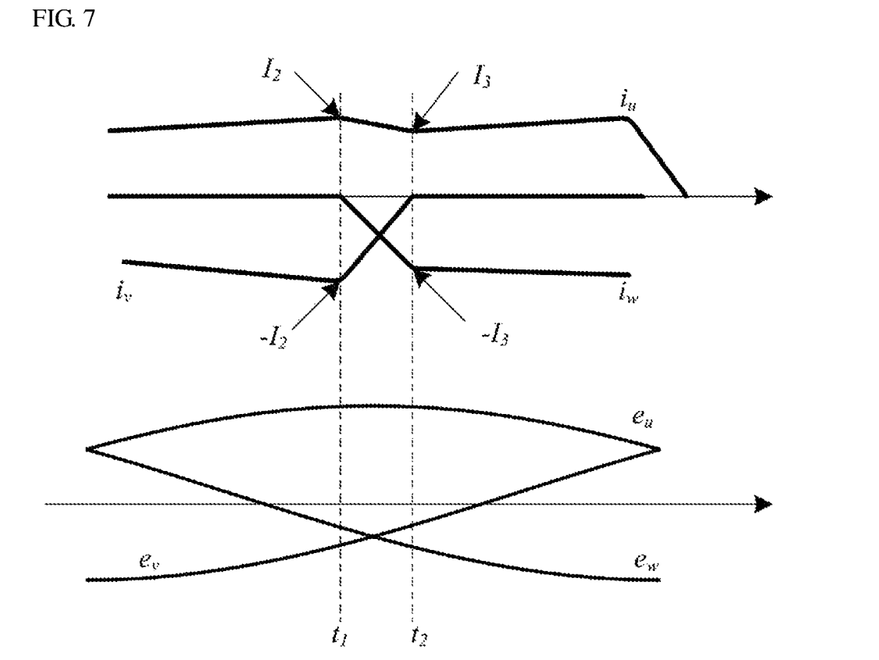
FIG. 7 is a graph illustrating a phase current waveform and a back electromotive force waveform in an enlarged view of the area A of FIG. 6.

FIG. 7 is a graph illustrating a phase current waveform and a back electromotive force waveform in an enlarged view of the area A of FIG. 6.

Referring to FIGS. 2 to 7, the fault diagnosis apparatus 30 may detect a short circuit between adjacent coils in the permanent magnet motor 40 at an early stage of occurrence, thus allowing the user to promptly cope with this fault. It is therefore possible to prevent the permanent magnet motor 40 from being deteriorated, destroyed, or burned due to a short circuit.

The equivalent circuit of the permanent magnet motor 40 and the inverter 20 is shown in FIG. 3. The sinusoidal back electromotive force of each phase may be defined as shown in Equation 1. When the permanent magnet motor 40 is driven by a square wave, the waveform of a phase voltage and the waveform of a phase current are shown in FIG. 4.

$$\begin{cases} e_u = \sqrt{2}\,E\cos(\omega t) \\ e_v = \sqrt{2}\,E\cos(\omega t - 2\pi/3) \\ e_w = \sqrt{2}\,E\cos(\omega t + 2\pi/3) \end{cases} \quad \text{[Equation 1]}$$

In Equation 1, $e_u$ denotes the u-phase back electromotive force of the permanent magnet motor 40, $e_v$ denotes the v-phase back electromotive force of the permanent magnet motor 40, and $e_w$ denotes the w-phase back electromotive force of the permanent magnet motor 40. In addition, E denotes an effective value of the back electromotive force of the permanent magnet motor 40, and $\omega$ denotes an electric angular velocity.

Therefore, the back electromotive force and a switching pattern of the permanent magnet motor 40 are maintained regularly within the electric angular section of 60 degrees.

For example, in the section of 0°<ωt<60° where the u-phase and the w-phase are excited and the v-phase is open, the first switching device 21 is in the on or off state depending on a PWM signal, the sixth switching device 26 is always in the on state, and the other switching devices 22, 23, 24 and 25 are all in the off state. Namely, the inverter 20 may have four types according to a PWM signal state and a conduction state of the freewheeling diode in the opened phase.

Hereinafter, for convenience of analysis, it is assumed that the switch and the freewheeling diode are ideal in the current and voltage equations and no voltage drop occurs when they are conducted.

First, when ωt is 0 degree and when the inverter 20 turns the v-phase off and turns the w-phase on, the current of the turned-off phase is not instantaneously zero due to the inductance component and decreases at a constant slope as flowing through the freewheeling diode. Namely, until the current of the v-phase is completely extinct, a terminal voltage of the v-phase is always detected as the voltage $V_{dc}$ of the power source 10 in the equivalent circuit (FIG. 5) regardless of the on/off state of the PWM signal. This is shown in Equation 2.

$$v_{vn} = V_{dc} \quad \text{[Equation 2]}$$

Here, $v_{vn}$ denotes the v-phase terminal voltage of the inverter 20, and $V_{dc}$ denotes the voltage of the power source 10.

Therefore, the equivalent circuit of FIG. 5 is expressed as Equations 3 to 5.

$$\begin{cases} i_u + i_v + i_w = 0 \\ e_u + e_v + e_w = 0 \end{cases} \quad \text{[Equation 3]}$$

Here, $i_u$ denotes the u-phase current of the permanent magnet motor 40, denotes the v-phase current of the permanent magnet motor 40, and $i_w$ denotes the w-phase current of the permanent magnet motor 40.

$$V_{dc} = v_{vs} - v_{ws} \quad \text{[Equation 4]}$$

$$V_{dc} = v_{us} - v_{ws} \quad \text{[Equation 5]}$$

Here, $v_{us}$ denotes the u-phase voltage of the permanent magnet motor 40, $v_{vs}$ denotes the v-phase voltage of the permanent magnet motor 40, and $v_{ws}$ denotes the w-phase voltage of the permanent magnet motor 40.

Therefore, the voltage equation of the permanent magnet motor 40 is obtained as shown in Equation 6, and the inductance calculation unit 34 may calculate the inductance of each phase using equations derived from Equation 6. Hereinafter, a process of deriving equations for calculating the inductance of each phase by the inductance calculation unit 34 will be described in detail.

$$\begin{cases} v_{us} = Ri_u + L_1\dfrac{di_u}{dt} + e_u \\ v_{vs} = Ri_v + L_2\dfrac{di_v}{dt} + e_v \\ v_{ws} = Ri_w + L_3\dfrac{di_w}{dt} + e_w \end{cases} \quad \text{[Equation 6]}$$

Here, R denotes the resistance of the permanent magnet motor 40, and L1, L2 and L3 denote the inductances of respective phases of the permanent magnet motor 40.

Using Equation 6, Equations 4 and 5 are rewritten as Equations 7 and 8, respectively.

$$V_{dc} = Ri_v + L_2\dfrac{di_v}{dt} + e_v - Ri_w - L_3\dfrac{di_w}{dt} - e_w \quad \text{[Equation 7]}$$

$$V_{dc} = Ri_u + L_1\dfrac{di_u}{dt} + e_u - Ri_w - L_3\dfrac{di_w}{dt} - e_w \quad \text{[Equation 8]}$$

Then, using Equations 7 and 8, Equation 9 is obtained.

$$Ri_u + L_1\dfrac{di_u}{dt} + e_u = Ri_v + L_2\dfrac{di_v}{dt} + e_v \quad \text{[Equation 9]}$$

Meanwhile, the neutral voltage, $v_s$, may be expressed as Equation 10 by using the w-phase voltage, $v_{ws}$, and Equation 3.

$$\begin{aligned} v_s &= -v_{ws} \quad \text{[Equation 10]} \\ &= -Ri_w - L_3\dfrac{di_w}{dt} - e_w \\ &= R(i_u + i_v) + \left(L_1\dfrac{di_u}{dt} + L_2\dfrac{di_v}{dt}\right) + (e_u + e_v) \end{aligned}$$

Assuming that $L = L_1 = L_2$, Equation 10 is rewritten as Equation 11.

$$v_s = 2\left(Ri_u + L\frac{di_u}{dt} + e_u\right) \quad \text{[Equation 11]}$$

$$= 2\left(Ri_v + L\frac{di_v}{dt} + e_v\right)$$

Equation 6, which is the voltage equation of the permanent magnet motor 40, is expressed as Equation 12 by using Equations 10 and 11.

$$\begin{cases} Ri_u + L_1\frac{di_u}{dt} + e_u = \frac{1}{3}V_{dc} \\ Ri_v + L_2\frac{di_v}{dt} + e_v = \frac{1}{3}V_{dc} \\ Ri_w + L_3\frac{di_w}{dt} + e_w = -\frac{2}{3}V_{dc} \end{cases} \quad \text{[Equation 12]}$$

Meanwhile, FIG. 7 in which the area A of FIG. 6 is enlarged shows the phase current and the back electromotive force at a shift in phase of the permanent magnet motor 40. In FIG. 7, $t_1$ denotes the start time of the phase shift, and $t_2$ denotes the end time of the phase shift. In addition, $I_2$ and $I_3$ refer to the magnitude of the phase current at the phase shift start time and the phase shift end time, respectively. Here, it is assumed that each phase current linearly increases or decreases during the phase shift.

Using Equation 12, Equations 13 to 15 are obtained in case of the phase shift.

$$\int_{t_1}^{t_2} L_1 di_u = -\int_{t_1}^{t_2} Ri_u dt + \int_{t_1}^{t_2} \tfrac{1}{3} DV_{dc} dt - \int_{t_1}^{t_2} e_u dt \quad \text{[Equation 13]}$$

$$\int_{t_1}^{t_2} L_2 di_v = -\int_{t_1}^{t_2} Ri_v dt + \int_{t_1}^{t_2} \tfrac{1}{3} DV_{dc} dt - \int_{t_1}^{t_2} e_v dt \quad \text{[Equation 14]}$$

$$\int_{t_1}^{t_2} L_1 di_w = -\int_{t_1}^{t_2} Ri_w dt + \int_{t_1}^{t_2} \tfrac{1}{3} DV_{dc} dt - \int_{t_1}^{t_2} e_w dt \quad \text{[Equation 15]}$$

Here, D means the PWM duty ratio of the inverter 200. Equations 13 to 15 may be rewritten as Equations 16 to 18, respectively.

$$L_1(I_3 - I_2) = \left\{-R\left(\frac{I_2 + I_3}{2}\right) + \frac{DV_{dc}}{3}\right\}(t_2 - t_1) - \int_{t_1}^{t_2} e_u dt \quad \text{[Equation 16]}$$

$$L_2 I_2 = \left(\frac{RI_2}{2} + \frac{DV_{dc}}{3}\right)(t_2 - t_1) - \int_{t_1}^{t_2} e_v dt \quad \text{[Equation 17]}$$

$$L_3 I_3 = \left(-\frac{RI_3}{2} + \frac{2DV_{dc}}{3}\right)(t_2 - t_1) + \int_{t_1}^{t_2} e_w dt \quad \text{[Equation 18]}$$

Meanwhile, assuming that the resistance R in Equation 16 can be ignored because of being small and a change in the back electromotive force is linear in the phase shift because the phase shift is short in time, Equation 19 is obtained.

$$L_1 = \frac{(t_2 - t_1)\left(\frac{DV_{dc}}{3} - \sqrt{2}E\right)}{(I_3 - I_2)} \quad \text{[Equation 19]}$$

Namely, using the input voltage ($V_{dc}$) and the input currents ($I_3$, $I_2$) measured by the current voltage measurement unit 31 and the phase shift time ($t_2$-$t_1$) calculated by the phase shift time calculation unit 32, the inductance calculation unit 34 may calculate the inductance of one phase. Here, $I_2$ is the phase current at the phase shift start and is equal to the input current at the phase shift start, thus being represented as $I_{dc\_s}$. Similarly, $I_3$ is the phase current at the phase shift end and is equal to the input current at the phase shift end, thus being represented as $L_{dc\_e}$. Therefore, Equation 19 is rewritten as Equation 20.

$$L_1 = \frac{(t_2 - t_1)\left(\frac{DV_{dc}}{3} - \sqrt{2}E\right)}{(I_{dc\_e} - I_{dc\_s})} \quad \text{[Equation 20]}$$

Here, $L_n$ denotes the inductance of each phase, and n is from 1 to 3.

The inductance calculation unit 34 may calculate L1, L2 and L3 in each section. Here, each section refers to each of six sections that are generated in a single electric angular rotation.

The fault diagnosis unit 35 compares the inductance of each phase, calculated by the inductance calculation unit 34, with the reference inductance to calculate an error value. If the error value is included in the normal range, the fault diagnosis unit 35 determines that there is no short circuit. On the other hand, if the error value is not included in the normal range, the fault diagnosis unit 35 determines that the coil wound in the corresponding phase is short-circuited. In addition, the fault diagnosis unit 35 may not only determine a specific phase where the short circuit occurs, but also determine the degree of the short circuit. Namely, the fault diagnosis unit 35 may determine that the degree of the short circuit is greater as the error value is larger. Preferably, the fault diagnosis unit 35 may classify the degrees of the short circuit into ratings on the basis of predefined ranges and generate an alert signal corresponding to each rating.

For example, the fault diagnosis unit 35 may define three ratings such as caution, warning and danger. In case of the caution that indicates an initial stage of the short circuit, the fault diagnosis unit 35 may generate an alert signal that recommends interruption and repair of the permanent magnet motor 40. In case of the warning that indicates a somewhat advanced stage of the short circuit, the fault diagnosis unit 35 may generate an alert signal that strongly demands interruption and repair of the permanent magnet motor 40. In case of the danger that indicates a considerably advanced stage of the short circuit having a risk that the permanent magnet motor 40 will be destroyed or burned, the fault diagnosis unit 35 may generate an alert signal that forcibly terminates the operation of the permanent magnet motor 40.

Figure 8:
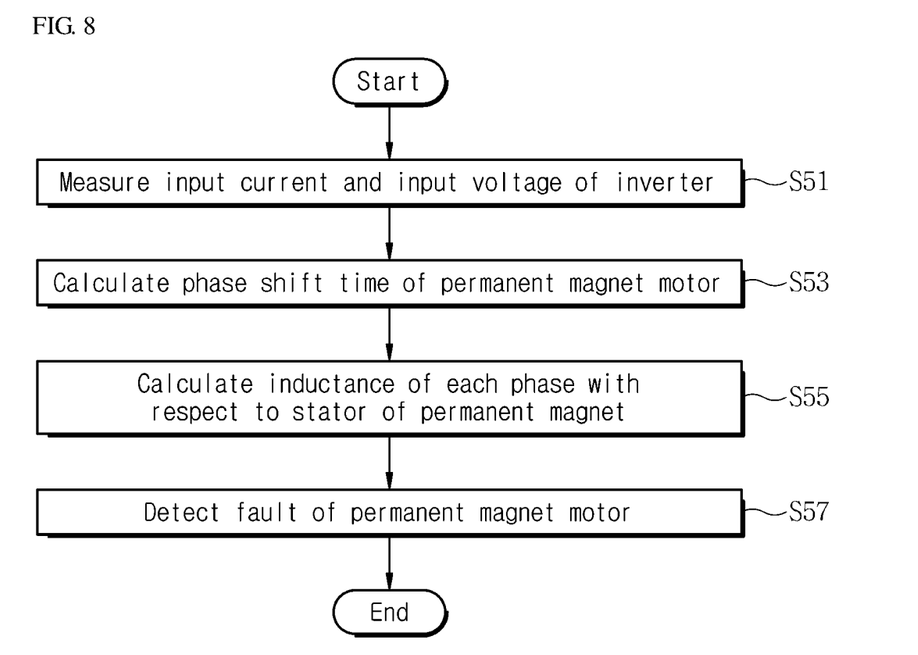
FIG. 8 is a flow diagram illustrating a fault diagnosis method for a permanent magnet motor according to an embodiment of the present invention.

FIG. 8 is a flow diagram illustrating a fault diagnosis method for a permanent magnet motor according to an embodiment of the present invention.

Referring to FIGS. 2 and 8, the fault diagnosis method for the permanent magnet motor 40 includes calculating an inductance for each phase of the permanent magnet motor 40 driven by a square wave, comparing the calculated inductance with a reference inductance to calculate an error value, and detecting a fault of the permanent magnet motor 40 in real time. In the fault diagnosis method, if the error value between the inductance of a certain phase and the reference inductance is not included in the normal range, it is determined that the coil wound in the phase is short-circuited. Also, it may be determined that the degree of the short circuit is greater as the error value is larger.

At step S51, the fault diagnosis apparatus 30 measures an input current and an input voltage of the inverter 20 connected to the permanent magnet motor 40 driven by a square wave. Namely, the fault diagnosis apparatus 30 measures a current and a voltage inputted from the power source 10 to an input terminal of the inverter 20.

At step S53, the fault diagnosis apparatus 30 calculates a phase shift time between the start and end of a phase shift in the permanent magnet motor 40. Namely, the fault diagnosis apparatus 30 measures each of a phase shift start time and a phase shift end time in the permanent magnet motor 40 and then calculates the phase shift time by subtracting the phase shift start time from the phase shift end time.

At step S55, the fault diagnosis apparatus 30 calculates the inductance of each phase with respect to the stator of the permanent magnet motor 40 from the input current, the input voltage, and the phase shift time. Namely, the fault diagnosis apparatus 30 calculates in real time the inductances of the u-phase, v-phase and w-phase of the permanent magnet motor 40, respectively, with respect to the stator by using a voltage equation of the permanent magnet motor 40.

At step S57, the fault diagnosis apparatus 30 compares the calculated inductance of each phase with the reference inductance of the permanent magnet motor 40 and thereby detects whether a fault occurs in the permanent magnet motor 40. At this time, the fault diagnosis apparatus 30 calculates an error value between the inductance of each phase and the reference inductance. Then the fault diagnosis apparatus 30 determines that no short circuit occurs when the calculated error value is included in the normal range, and determines that a short circuit occurs when the calculated error value is not included in the normal range. Also, the fault diagnosis apparatus 30 detects the degree of the short circuit through the magnitude of the error value. Preferably, the fault diagnosis apparatus 30 may determine that the degree of the short circuit is greater as the error value is larger.

While this disclosure has been particularly shown and described with reference to an exemplary embodiment thereof, it will be understood by those skilled in the art that various changes in form and details may be made therein without departing from the scope of the present invention as defined by the appended claims.

What is claimed is:

1. An apparatus for diagnosing a short-circuit in a motor that comprises a rotor of permanent magnet and stators of three-phases, the apparatus comprising:
    a current voltage measurement unit connected to an inverter configured to drive the motor, the current voltage measurement unit configured to measure a current input and a voltage input to the motor received from the inverter; and
    at least one controller configured to, for each phase of the motor;
    compute a phase shift time of the motor indicating a time between a start and an end of a phase shift in the motor,
    compute an inductance using the phase shift time, the current input and the voltage input,
    compute an error value between the computed inductance and a predetermined reference inductance, and
    when the error value is out of a predetermined range of normal operation, determine that a stator of the motor in a corresponding phase is short-circuited such that a short-circuited stator is detected while the motor is in operation,
    wherein the system further comprises an output unit configured to generate a visual or audible alarm when a short-circuited stators detected.

2. The apparatus of claim 1, wherein the least one controller is configured to compute the inductance using Equation 1:

$$\begin{cases} v_{us} = Ri_u + L_1 \dfrac{di_u}{dt} + e_u \\ v_{vs} = Ri_v + L_2 \dfrac{di_v}{dt} + e_v \\ v_{ws} = Ri_w + L_3 \dfrac{di_w}{dt} + e_w \end{cases} \quad \text{[Equation 1]}$$

where $v_{us}$, $v_{vs}$, and $v_{ws}$ denote a u-phase voltage, a v-phase voltage, and a w-phase voltage of the motor, respectively, where $i_u$, $i_v$, and $i_w$ denote a u-phase current, a v-phase current, and a w-phase current of the motor, respectively, where $L_1$, $L_2$, and $L_3$ denote a u-phase inductance, a v-phase inductance, and a w-phase inductance of the motor, respectively, where $e_u$, $e_v$, and $e_w$ denote a u-phase back electromotive force, a v-phase back electromotive force, and a w-phase back electromotive force of the motor, respectively, and where R denotes a resistance of the motor.

3. The apparatus of claim 2, wherein the at least one controller is configured to compute inductance of each phase by using Equation 2 derived from Equation 1:

$$L_1 = \frac{(t_2 - t_1)\left(\dfrac{DV_{dc}}{3} - \sqrt{2}\,E\right)}{(I_{dc\_e} - I_{dc\_s})} \quad \text{[Equation 2]}$$

where $L_n$ denotes the inductance of each phase, where n is from 1 to 3, where $t_2 - t_1$ denotes the phase shift time, where $t_1$ denotes a start time of the phase shift and $t_2$ denotes an end time of the phase shift, where D denotes a PWM duty ratio, where $V_{dc}$ denotes the input voltage, where E denotes an effective value of the back electromotive force, where $I_{dc\_s}$ denotes an input current at the phase shift start, and where $I_{dc\_e}$ denotes an input current at the phase shift end.

4. The apparatus of claim 1, wherein the at least one controller is further configured to determine that a degree of short circuit using the error vale, and wherein the greater the error value is, the greater the degree of short circuit.

5. The apparatus of claim 1, wherein the at least one controller is further configured to determine a rating of short circuit and generate an alert corresponding to the rating of short circuit.

6. A motor diagnosis system comprising:
    a motor comprising a rotor of permanent magnet and stators of three-phases;
    an inverter configured to drive the motor;
    a current voltage measurement unit connected to the inverter and configured to measure a current input and a voltage input to the motor received from the inverter; and
    at least one control unit configured to, for each phase of the motor:
    compute a phase shift time of the motor indicating a time between a start and an end of a phase shift in the motor,
    compute an inductance using the phase shift time, the current input and the voltage input,
    compute an error value between the computed inductance and a predetermined reference inductance, and
    when the error value is out of a predetermined range of normal operation, determine that a stator of the motor in a corresponding phase is short-circuited such that a short-circuited stator is detected while the motor is in operation.

7. A method of diagnosing a short-circuit in a motor that has a rotor of permanent magnet and stators of three-phases, the method comprising:
- measuring, using a current voltage measurement unit connected to an inverter for driving the motor, a current input and a voltage input to the motor by the inverter;
- computing, by a controller, a phase shift time of the motor indicating a time between a start and an end of a phase shift in the motor;
- computing, by the controller, an inductance using the phase shift time, the current input and the voltage input;
- computing, by the controller, an error value between the computed inductance and a predetermined reference inductance; and
- determining, by the controller, that a stator of the motor is short-circuited when the error value is out of a predetermined range of normal operation such that a short-circuited stator is detected while the motor is in operation.

8. The method of claim 7, further comprising generating, by the controller, a visual or audible alarm when a short-circuited stator is detected.

9. The system of claim 6, further comprising an output unit configured to generate a visual or audible alarm when a short-circuited stator is detected.

* * * * *